United States Patent [19]
Kakuma et al.

[11] Patent Number: 5,117,333
[45] Date of Patent: May 26, 1992

[54] SOLID ELECTROLYTIC CAPACITOR WITH ORGANIC SEMICONDUCTOR AND METHOD OF MANUFACTURING THE SAME

[75] Inventors: Kenji Kakuma, Kyoto; Katsunori Mizutomi, Moriguchi; Shinichi Niwa, Toyonaka, all of Japan

[73] Assignee: Sanyo Electric Co., Ltd., Osaka, Japan

[21] Appl. No.: 722,424

[22] Filed: Jun. 27, 1991

[30] Foreign Application Priority Data

Jun. 29, 1990 [JP] Japan .................. 2-173371
Jan. 31, 1991 [JP] Japan .................. 3-11337
Apr. 11, 1991 [JP] Japan .................. 3-78738

[51] Int. Cl.⁵ .............................. H01G 9/02
[52] U.S. Cl. ........................ 361/527; 29/25.03
[58] Field of Search ............ 29/25.03; 361/525, 526, 361/527

[56] References Cited

U.S. PATENT DOCUMENTS 3,443,164  5/1969  Hazzard ............... 29/25.03 X
4,580,855  4/1986  Niwa .................. 361/525
5,055,975  10/1991 Behrend ............... 361/527

FOREIGN PATENT DOCUMENTS 62-52939  11/1987  Japan .
12518     1/1989   Japan ................. 29/25.03

Primary Examiner—Donald Griffin
Attorney, Agent, or Firm—Armstrong, Nikaido, Marmelstein, Kubovcik & Murray

[57] ABSTRACT

Disclosed herein is a solid electrolyte capacitor with organic semiconductor which comprises a capacitor element, a solid electrolyte layer formed by heating and melting TCNQ complex salt, impregnating the TCNQ salt into the capacitor element and thereafter cooling and solidifying the same, a powder coating layer formed to cover an upper portion of the capacitor element through a clearance, and a sealing resin layer covering the powder coating layer for sealing the capacitor element.

Since the powder coating layer is formed on the upper portion of the capacitor element through a clearance, it is possible to reduce influence exerted on the element by contraction or expansion caused by thermal stress which is applied in a soldering step. Consequently, it is possible to suppress increase of a leakage current.

16 Claims, 4 Drawing Sheets

SOLID ELECTROLYTIC CAPACITOR WITH ORGANIC SEMICONDUCTOR AND METHOD OF MANUFACTURING THE SAME

BACKGROUND OF THE INVENTION

Field of the Invention

The present invention relates to a solid electrolytic capacitor with organic semiconductor and a method of manufacturing the same, and more particularly, it relates to a solid electrolytic capacitor with organic semiconductor having an electrolyte of 7,7,8,8-tetracyanoquinodimethane (hereinafter referred to as TCNQ complex salt) and a method of manufacturing the same.

Description of the Background Art

Japanese Patent Publication Gazette No. 62-52939 (1987) discloses application of an organic semiconductor, particularly TCNQ complex salt, to a solid electrolyte for a solid electrolytic capacitor. FIG. 3 is a sectional view showing such a conventional solid electrolytic capacitor. Referring to FIG. 3, organic semiconductor powder 26 which is prepared from TCNQ complex salt is contained in a case 25 of a heat conductive material such as aluminum, under an appropriate pressure. The organic semiconductor powder 26 is melted and liquefied at a temperature of 250° to 300° C., and a previously heated capacitor element 21 is dipped in the liquefied TCNQ complex salt 26, to be impregnated with the TCNQ complex salt 26. Then, both the capacitor element 21 and the case 25 are quenched. Thereafter non-flexible thermosetting resin such as epoxy resin is filled into an opening portion of the case 25 and left under a temperature of 85° to 105° C. for a long time to be hardened, thereby forming a sealing resin layer 27. The anode of the capacitor element 21 is made by forming foil of a metal, such as aluminum, tantalum or niobium, having a valve action. On the other hand, the cathode is prepared from foil of such a metal, which is not chemically converted. A spacer sheet is inserted between the anode foil member and the cathode foil member, and this material is rolled to form the capacitor element 21. An anode lead wire 22 and a cathode lead wire 23 are connected to the capacitor element 21. Lead bosses 24 are provided on connecting portions of the anode and cathode lead wires 22 and 23.

In such a conventional solid electrolytic capacitor, the capacitor element is sealed with the non-flexible thermosetting epoxy resin. In order to apply such a capacitor containing TCNQ complex salt to a surface mounting part, a soldering step is inevitably required. However, the conventional solid electrolytic capacitor cannot withstand thermal stress of about 230° C. which is applied in the soldering step, and causes characteristic deterioration such as significant increase of a leakage current.

This is conceivably because the interior of the capacitor element is impregnated with the epoxy resin since the conventional capacitor of this type is sealed with the thermosetting epoxy resin, and hence the organic semiconductor serving as a solid electrolyte reacts with the epoxy resin to cause the characteristic deterioration.

Further, stress may be applied to an oxide film due to contraction caused by hardening of the epoxy resin which is impregnated into the interior of the capacitor element and expansion caused by heating in the soldering step, to increase the leakage current. In a step of voltage treatment (aging), or before and after the soldering step, the epoxy resin adhering to the oxide film which is formed on the aluminum foil member provided in the capacitor element and the hardened TCNQ complex salt is thermally expanded or contracted by an abrupt temperature change (heat shock). At this time, the non-flexible epoxy resin applies stress onto the oxide film which is formed on the aluminum foil member and the TCNQ complex salt. Thus, the oxide film and the hardened TCNQ complex salt may be damaged, to cause increase of the leakage current.

In a method capable of solving the aforementioned problem, the capacitor element is covered with resin such as denatured acrylic resin or urethane resin. FIG. 4 is a sectional view showing such a capacitor. Referring to FIG. 4, a capacitor element 31, which is impregnated with TCNQ complex salt 36, is covered with a resin layer 38 such as denatured acrylic resin or urethane resin. This resin layer 38 is covered with an epoxy resin layer 37, which is left under a temperature of 85° to 105° C. for a long time to be hardened. When denatured acrylic resin is employed, the characteristics are certainly improved in a heat test, but such improvement is still insufficient. Further improvement of heat resistance is strongly awaited.

An aluminum solid electrolytic capacitor employing TCNQ complex salt has excellent frequency and temperature characteristics, which are extremely superior to those of a conventional dry type capacitor.

With recent miniaturization of electric devices, a surface-mountable product is strongly required in relation to a capacitor employing TCNQ complex salt. However, as hereinabove described, such a capacitor cannot withstand the thermal stress applied in a soldering step, which is requisite for application to a surface mounting part. Thus, the leakage current is disadvantageously increased. In such a capacitor employing TCNQ complex salt, therefore, improvement in heat resistance is strongly awaited.

SUMMARY OF THE INVENTION

An object of the present invention is to provide a solid electrolytic capacitor with organic semiconductor having excellent heat resistance, whose leakage current is hardly changed by thermal stress applied in a soldering step, and a method of manufacturing the same.

A solid electrolytic capacitor with organic semiconductor according to the present invention comprises a capacitor element, a solid electrolyte layer impregnated into the capacitor element, a powder coating layer covering an upper portion of the capacitor element through a clearance, and a sealing resin layer covering the powder coating layer for sealing the capacitor element.

According to the present invention, the capacitor element is formed by inserting a separator sheet between an anode foil member which is provided with an oxide film on its surface and a cathode foil member which is made of the same metal as the anode foil member, and rolling this material.

According to the present invention, the solid electrolyte layer is formed by heating and melting TCNQ complex salt, having electric conductivity applicable to an electrolyte for a capacitor, to be impregnated into the capacitor element and thereafter cooling and hardening the same.

The anode foil member forming the capacitor element which is employed according to the present invention is provided with an oxide film on its surface. This oxide film can be formed by anodized forming or anode chemical conversion. The anode foil member is preferably made of a metal having a valve action. Such a metal material may be prepared from aluminum, tantalum or niobium, for example.

The sealing resin layer employed according to the present invention may be prepared from epoxy resin, for example.

The TCNQ complex salt forming the solid electrolyte layer employed according to the present invention may be prepared from an equal-weight mixture of N-phenethyllutidinium.(TCNQ)$_2$ and N,N-pentamethylene.(lutidinium)$_2$.(TCNQ)$_4$. Alternatively, the TCNQ complex salt may be prepared from N-n-propylquinoline, N-ethylisoquinoline, N-isopropylquinoline or N-n-hexylquinoline.

According to the present invention, the powder coating layer is provided on an upper portion of the capacitor element through a clearance. Therefore, no reaction takes place between the solid electrolyte layer and the resin. Further, it is possible to prevent the capacitor element from mechanical stress which is caused by contraction of the resin in a hardening step and expansion of the resin in a heating step.

According to a first embodiment of the present invention, the powder coating layer contains inorganic powder or an inorganic compound having a melting point of at least 230° C. The inorganic powder may be prepared from activated clay, activated carbon, diatomaceous earth or activated alumina, for example.

The powder coating layer may be prepared from resin such as epoxy resin, acrylic resin or polyester resin.

According to the first embodiment, the time for hardening the melted powder coating material is so reduced that it is possible to completely harden the coating material before the same is impregnated into the capacitor element. Thus, substantially no resin is contained in the capacitor element, and the powder coating layer can be provided on the upper portion of the capacitor element through a clearance.

The inorganic powder is preferably prepared from a porous material such as activated clay, activated carbon, diatomaceous earth or activated alumina. This is because such a porous material adsorbs various gases which are generated through heat in a soldering step etc., thereby suppressing pressure increase in the capacitor. Thus, it is possible to substantially prevent deterioration of the oxide film and a defective sealing state.

A method of manufacturing a solid electrolytic capacitor with organic semiconductor according to the present invention comprises a step of preparing a capacitor element by inserting a separator sheet between an anode foil member and a cathode foil member and rolling this material, a step of heating and melting TCNQ complex salt having electric conductivity applicable to an electrolyte for a capacitor and impregnating the same into the capacitor element, a step of cooling and solidifying the impregnated TCNQ complex salt for forming a solid electrolyte layer, a step of forming a powder coating layer covering an upper portion of the capacitor element through a clearance, and a step of forming a sealing resin layer for covering the powder coating layer and sealing the capacitor element.

According to the first embodiment of the present invention, the powder coating layer is formed by a coating powder, preferably a coating material mixed with inorganic powder. The inorganic powder can be prepared from the aforementioned material.

According to a second embodiment of the present invention, the sealing resin layer is heated and hardened at a temperature lower than the melting temperature of the powder coating material. After the sealing resin layer is hardened, the powder coating layer is heated, melted and hardened.

The powder coating material preferably contains no volatile dispersion medium. According to the second embodiment, it is possible to easily form a space in the interior of the capacitor. Due to presence of such a space, the element is prevented from the general problem of influence exerted by contraction or expansion of the coating resin layer caused by thermal stress which is applied in the soldering step. Consequently, it is possible to suppress increase of the leakage current based on such thermal stress.

According to a third embodiment of the present invention, the powder coating layer is melted under steam of at least 1 atm. According to the third embodiment of the present invention, melted and liquefied TCNQ complex salt is impregnated into a capacitor element, and then cooled and hardened. Thereafter the capacitor element is coated with a powder coating material. At this time, the powder coating material is melted and hardened under steam of at least 1 atm. The powder coating material preferably contains no volatile dispersion medium. Under such steam of at least 1 atm., the atmosphere temperature exceeds 100° C., to heat the powder coating material up to its melting temperature. In the third embodiment, it is predicted that water molecules act on the TCNQ complex salt. For example, TCNQ, which is a radical part of the TCNQ complex salt, induces disproportionation by Joule heat or the like, to form P-phenylenedimalononitrile. Further, it is conceivable that $\gamma$-Al$_2$O$_3$.H$_2$O (boehmite) or the like is formed by an action of the high-pressure steam on the anodic oxide film of the capacitor element, thereby sealing a defective portion of the anodic oxide film. According to the third embodiment, it is conceivable that a leakage current can be extremely reduced by such an action after a high-temperature soldering step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Example 1

Example 1 is in accordance with a first embodiment of the present invention. An anode aluminum foil member and a cathode aluminum foil member are rolled with a separator sheet of Manila paper which is inserted therebetween, to form a capacitor element. This capacitor element is impregnated with a solid electrolyte which is prepared from an equal-weight mixture of N-phenethyllutidinium.$(TCNQ)_2$ and N,N-pentamethylene.$(lutidinium)_2.(TCNQ)_4$.

Figure 1:
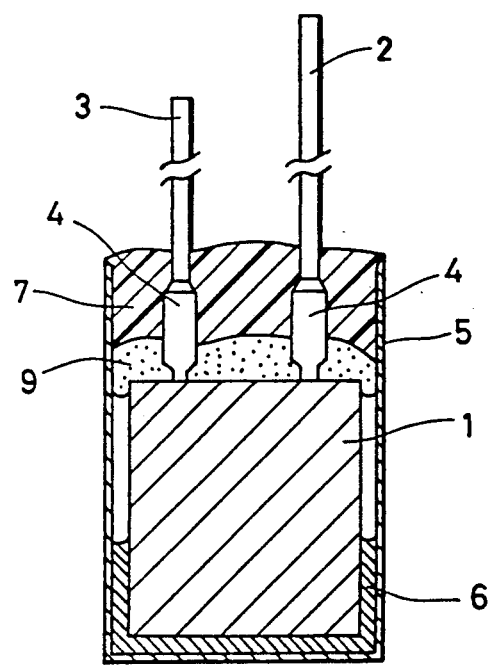
FIG. 1 is a sectional view showing an example of a solid electrolytic capacitor with organic semiconductor according to a first embodiment and a third embodiment of the present invention.

Referring to FIG. 1, a chemical conversion liquid is used to repair a section of an anode foil member of a capacitor element or a defective portion of an oxide film by applying a voltage which is substantially identical to an anode chemical conversion voltage. Then, heat treatment is performed at about 240° C. in order to reduce the diameter of the separator sheet, thereby carbonizing the separator sheet. These steps are repeated by two or three times.

Powder 6 of TCNQ complex salt is introduced into a cylindrical aluminum case 5, and this case 5 is placed on a hot plate, which is maintained at a temperature of 300° to 320° C., to be heated. The case 5 is adapted to finally define a case for the capacitor. Due to such heating, the TCNQ complex salt 6 which is contained in the case 5 is melted and liquefied. Then, the previously prepared capacitor element 1 is dipped in the liquefied TCNQ complex salt 6 which is contained in the case 5, to be impregnated with the TCNQ complex salt 6.

Then, the case 5 is immediately quenched to solidify the TCNQ complex salt 6. Thus, the capacitor element 1 is impregnated with the liquefied TCNQ complex salt 6, which in turn is recrystallized by the quenching, to form a solid electrolyte exhibiting high electrical conductivity.

Then, a powder coating material or a mixture 9 of a powder coating material and an inorganic material is introduced into the case 5 to substantially fill up the case 5, and then held at 125° C. Thus, the powder coating material is melted and solidified. After the powder coating material is solidified, epoxy resin 7 is injected onto the powder coating layer, to seal the opening portion of the case 5 by double coating. Further, the epoxy resin 7 is solidified at a temperature of about 105° C., to form a solid electrolytic capacitor. This capacitor is directed to application of a rated voltage (aging) at 125° C. for 1 hour.

Table 1 shows results of reflow tests which were made on inventive and conventional samples of solid electrolytic capacitors. The reflow tests were made through reflow furnaces at 160° C. for 2 minutes and at 230° C. for 30 seconds, in consideration of heat applied in soldering steps.

TABLE 1

| Sample | Initial Value | | After Reflow Test | | |
|---|---|---|---|---|---|
| | L. C./ After 15 sec. | E.S.R | ΔC/C | L.C./ After 1 min. | E.S.R |
| 1-A | 0.03 | 320 | −1.3 | 0.08 | 321 |
| 1-B | 0.03 | 320 | −1.5 | 0.07 | 320 |
| 1-C | 0.03 | 331 | −1.2 | 0.05 | 333 |
| 1-D | 0.02 | 315 | −1.6 | 0.03 | 318 |
| 1-E | 0.03 | 340 | −1.4 | 0.04 | 345 |
| 1-F | 0.03 | 348 | −1.6 | 0.03 | 351 |
| 1-G | 0.03 | 315 | −1.8 | 0.03 | 318 |
| 1-H | 0.05 | 353 | −2.1 | 10.5 | 405 |
| 1-I | 0.04 | 361 | −3.6 | 0.81 | 413 |

Referring to Table 1, the samples were prepared from capacitors having rated voltages of 25 V and capacities of 1 μF, and symbols appearing therein represent the following values:

ΔC/C: rate of change of capacitance (%)
L.C.: leakage current (μA)
E.S.R.: equivalent series resistance (mΩ) at 100 KHz Referring to Table 1, the samples 1-A to 1-G were prepared in accordance with the present invention. The samples 1-H and 1-I are conventional samples.

Table 2 shows powder coating materials (primary sealant) and sealing resin (secondary sealant) employed for the respective samples.

TABLE 2

| Sample | Primary Sealant | Secondary Sealant |
|---|---|---|
| 1-A | epoxy powder coating material | epoxy resin |
| 1-B | polyester powder coating material | " |
| 1-C | acrylic powder coating material | " |
| 1-D | epoxy powder coating material (3 parts) activated clay (1 part) | " |
| 1-E | epoxy powder coating material (6 parts) diatomacious earth (1 part) | " |
| 1-F | epoxy powder coating material (2 parts) activated carbon (1 part) | " |
| 1-G | epoxy powder coating material (1 part) activated alumina (1 part) | " |
| 1-H | none | " |
| 1-I | denatured acrylic resin | " |

As understood from Table 1, the inventive samples 1-A to 1-G attained excellent results in all electric characteristics. In the conventional samples 1-H and 1-I, on the other hand, the capacitor elements were impregnated with the sealing resin, and it is understood that the characteristics were significantly deteriorated by mechanical stress applied in the reflow tests, chemical reaction between the sealing resin and the TCNQ complex salt, and the like.

Thus, when the powder coating material is mixed with inorganic powder or an inorganic compound having a melting point of at least 230° C., impregnation into the capacitor element is effectively reduced. If the powder coating material is mixed with inorganic powder or an inorganic compound having a melting point of less than 230° C., the inorganic powder or the inorganic compound is inevitably melted by heat, exceeding 230° C., which is applied in a soldering step, to disadvantageously case a defective sealing state or the like.

Example 2

Figure 2:
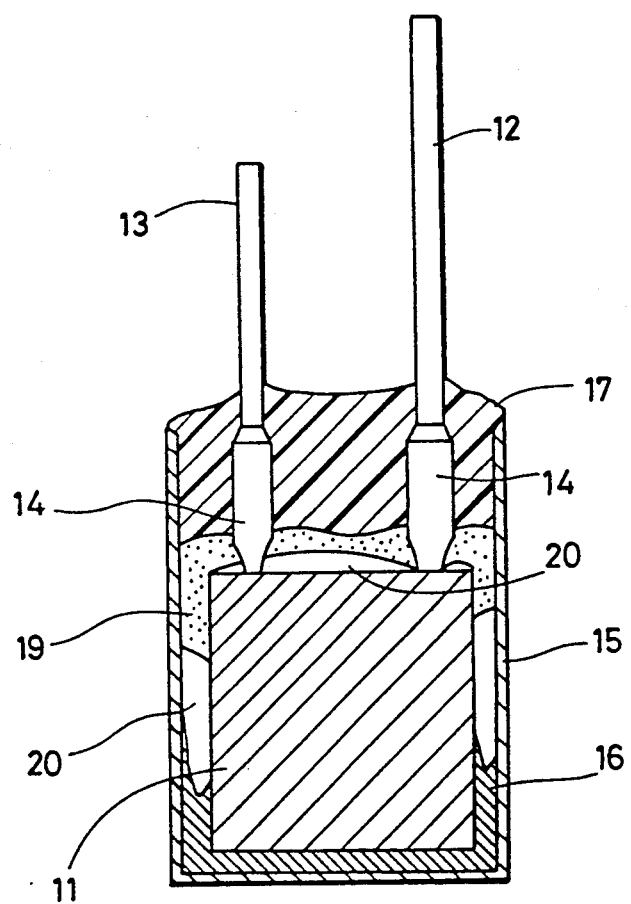
FIG. 2 is a sectional view showing an example of an organic semiconductor electrolytic capacitor according to a second embodiment of the present invention.
Figure 3:
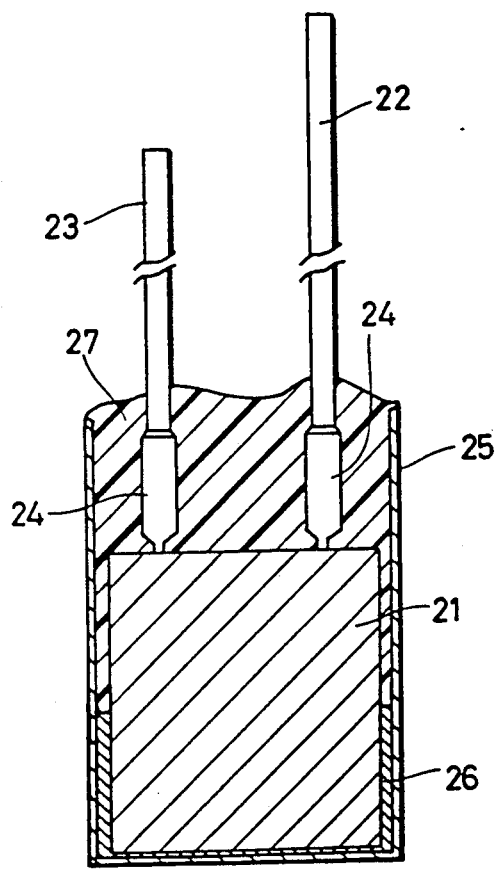
FIG. 3 is a sectional view showing an example of a conventional solid electrolytic capacitor with organic semiconductor.
Figure 4:
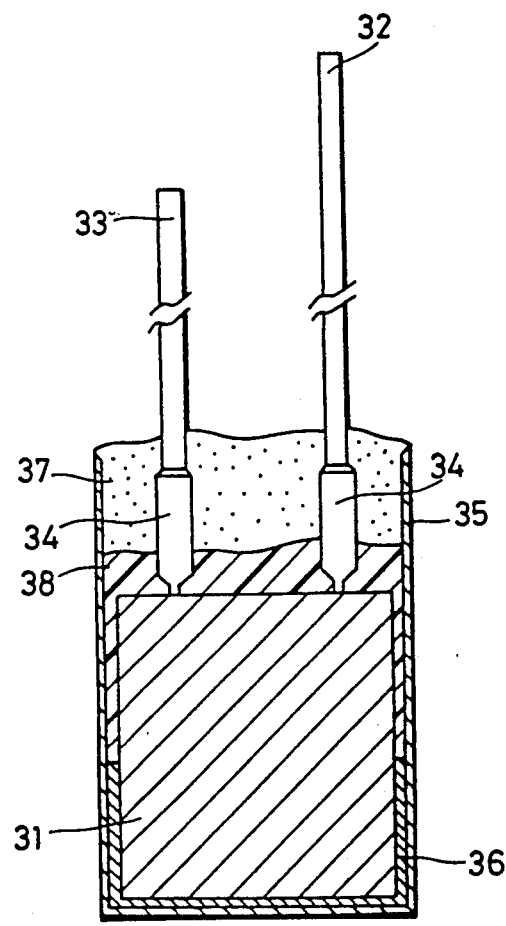
FIG. 4 is a sectional view showing another example of a conventional solid electrolytic capacitor with organic semiconductor.

Example 2 is in accordance with a second embodiment of the present invention. Referring to FIG. 2, an aluminum case 15 contains TCNQ complex salt 16. The TCNQ complex salt 16 can be prepared from an equal-weight mixture of N-phenethyllutidinium.$(TCNQ)_2$ and N,N-pentamethylene.$(lutidinium)_2.(TCNQ)_4$, for example. The case 15 is heated in order to heat and melt the TCNQ complex salt at 320° C. A chemically converted and carbonized capacitor element 11, which is previously heated, is impregnated with the TCNQ complex salt 16, and then quenched. Thereafter a powder coating material 19 containing no volatile dispersion medium is introduced into the case 15, to cover the capacitor element 11. Then, epoxy resin 17 is injected into the case 5 and hardened at a temperature of 85° C., for example, which is lower than the melting temperature of the powder coating material 19. Thereafter the powder coating material 19 is heated, melted and hardened at a temperature of about 150° C. Spaces 20 are defined between the case 15 and the capacitor element 11 as well as above the capacitor element 11. Due to presence of such spaces 20, it is possible to extremely reduce the general problem of influence which is exerted on the element by contraction or expansion caused by thermal stress which is applied in a soldering step. Consequently, it is possible to suppress increase of a leakage current which is based on such thermal stress.

Table 3 shows results of reflow tests which were made on inventive samples 2-A, 2-B and 2-C and conventional samples 2-D, 2-E, 2-F, 2-G and 2-H in consideration of heat generated in soldering steps for surface mounting. In such reflow tests, the capacitor samples were held at 160° C. for 2 minutes, and then held at 230° C. for 30 seconds in reflow furnaces. Table 3 shows characteristic values of capacitors having rated voltages of 25 V and capacities of 1.5 μF.

TABLE 3

| Sample | Leakage Current Before Test (μA/after 1 min.) | Leakage Current After Test (μA/after 1 min.) |
|---|---|---|
| 2-A | 0.04 | 0.65 |
| 2-B | 0.05 | 0.49 |
| 2-C | 0.04 | 0.53 |
| 2-D | 0.05 | 107 |
| 2-E | 0.06 | 18.6 |
| 2-F | 0.04 | 9.6 |
| 2-G | 0.05 | 8.9 |
| 2-H | 0.05 | 9.3 |

Table 4 shows materials for powder coating layers 19 and sealing resin layers 17 in relation to the respective samples.

TABLE 4

| Sample | Powder Coating Layer | Sealing Resin Layer |
|---|---|---|
| 2-A | epoxy powder coating material (not heated/melted before hardening of sealing resin layer) | epoxy resin |
| 2-B | polyester powder coating material (not heated/melted before hardening of sealing resin layer) | " |
| 2-C | acrylic powder coating material (not heated/melted before hardening of sealing resin layer) | " |
| 2-D | denatured acrylic resin | " |
| 2-E | urethane resin | " |
| 2-F | epoxy powder coating material (heated/melted/hardened before hardening of sealing resin layer) | " |
| 2-G | polyester powder coating material (heated/melted/hardened before hardening of sealing resin layer) | " |
| 2-H | acrylic powder coating material (heated/melted/hardened before hardening of sealing resin layer) | " |

It is clearly understood from Table 3 that the inventive samples 2-A, 2-B and 2-C exhibited excellent leakage current characteristics after soldering. In the conventional samples 2-D to 2-H, on the other hand, the leakage current characteristics were significantly deteriorated conceivably because of mechanical stress applied on the powder coating layers.

Example 3

Example 3 is in accordance with a third embodiment of the present invention. The third embodiment is preferably applied to a high-voltage and high-capacitance solid electrolytic capacitor with organic semiconductor, i.e., a high CV product capacitor, having a rated voltage of 25 V and a rated capacitance of 3.3 μF, for example. According to this embodiment, it is possible to attain improvement of heat resistance, which is strongly required for such a high CV product capacitor.

Referring again to FIG. 1, TCNQ complex salt 6 is introduced into a case 5 of aluminum. The TCNQ complex salt 6 may be prepared from that employed in Example 1 or 2, for example. This TCNQ complex salt 6 is heated to 320° C. and melted. A chemically converted and carbonized capacitor element 1, which is previously heated, is dipped in the melted TCNQ complex salt 6. The TCNQ complex salt 6 is impregnated into the capacitor element 1, and quenched. Thereafter a polyester powder coating material 9, for example, is introduced into the case 5, to cover the capacitor element 1. The powder coating material 9 is melted under steam conditions shown in Table 5, and hardened. Thereafter the powder coating layer 9 is covered with epoxy resin 7, which seals an opening portion of the case 5.

TABLE 5

| Sample | Steam | Leaving Time |
|---|---|---|
| 3-A | 1 atm. | 6 h. |
| 3-B | 2 atm. | 4 h. |
| 3-C | 3 atm. | 0.5 h. |

Table 6 shows results of reflow tests which were made on the samples of capacitors prepared according to the third embodiment and a comparative sample. The reflow tests were made under conditions of 160° C. for 2 minutes and 230° C. for 30 seconds in reflow furnaces.

TABLE 6

| Sample | Leakage Current Before Test (μA/after 1 min.) | Leakage Current After Test (μA/after 1 min.) |
|---|---|---|
| 3-A | 0.66 | 4.9 |
| 3-B | 0.68 | 5.2 |
| 3-C | 0.59 | 5.1 |
| 3-D | 0.71 | 106 |

Each comparator shown in Table 6 had a rated voltage of 25 V and a capacitance of 3.3 μF. The samples 3-A to 3-C were prepared according to the third embodiment, while the sample 3-D was prepared from a conventional capacitor. The inventive samples 3-A to 3-C attained excellent results in relation to leakage current characteristics after soldering. On the other hand, it is understood that the leakage current characteristic of the conventional sample 3-D was significantly deteriorated.

According to the third embodiment, as hereinabove described, the capacitor element is impregnated with the heated and liquefied TCNQ complex salt, cooled and solidified, and thereafter covered with the powder coating material, which in turn is melted and hardened under steam of at least 1 atm. Under such steam of at least 1 atm., the atmosphere temperature exceeds 100° C., to melt the powder coating material. In general, such a powder coating material is prepared from high polymers having high degrees of polymerization. Therefore, it is conceivable that the powder coating material is melted and hardened under steam of at least 1 atm. in such a state that water molecules are introduced between the high polymers. Thus, it is predicted that the water molecules act on the TCNQ complex salt such that supposedly TCNQ, a radical part in the TCNQ complex salt, for example, induces disproportionation by Joule heat or the like, to form P-phenylenedimalononitrile. It is also conceivable that $\gamma$-$Al_2O_3$.$H_2O$ (boehmite) or the like is formed on the anodic oxide film of the capacitor element by the action of the high-pressure steam, to seal a defective portion of the oxide film. The leakage current is extremely reduced after high-temperature soldering conceivably for such reason.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor with organic semiconductor comprising:
    a capacitor element formed by inserting a separator sheet between an anode foil member being provided with an oxide film on its surface and a cathode foil member and rolling this material;
    a solid electrolyte layer formed by heating and melting TCNQ complex salt having electrical conductivity being applicable to an electrolyte for a capacitor, impregnating said TCNQ complex salt into said capacitor element and thereafter cooling and solidifying the same;
    a powder coating layer formed to cover an upper portion of said capacitor element; and
    a sealing resin layer covering said powder coating layer for sealing said capacitor element.

2. A solid electrolytic capacitor with organic semiconductor in accordance with claim 1, wherein said oxide film of said anode foil member is formed by anodized forming.

3. A solid electrolytic capacitor with organic semiconductor in accordance with claim 1, wherein said oxide film of said anode foil member is formed by anode chemical conversion.

4. A solid electrolytic capacitor with organic semiconductor in accordance with claim 1, wherein said anode foil member and said cathode foil member are prepared from a metal having a valve action.

5. A solid electrolytic capacitor with organic semiconductor in accordance with claim 4, wherein said metal is selected from a group of aluminum, tantalum and niobium.

6. A solid electrolytic capacitor with organic semiconductor in accordance with claim 1, wherein said powder coating layer contains inorganic powder having a melting point of at least 230° C.

7. A solid electrolytic capacitor with organic semiconductor in accordance with claim 6, wherein said inorganic powder is prepared from at least one element selected from a group of activated clay, activated carbon, diatomaceous earth and activated alumina.

8. A solid electrolytic capacitor with organic semiconductor in accordance with claim 1, wherein said powder coating layer contains an inorganic compound.

9. A solid electrolytic capacitor with organic semiconductor in accordance with claim 1, wherein the material for said powder coating layer is selected from a group of epoxy resin, acrylic resin and polyester resin.

10. A solid electrolytic capacitor with organic semiconductor in accordance with claim 1, wherein said TCNQ complex salt forming said solid electrolyte layer is prepared from a mixture of N-phenethyllutidinium.$(TCNQ)_2$ and N,N-pentamethylene.(lutidinium)$_2$.$(TCNQ)_4$.

11. A solid electrolytic capacitor with organic semiconductor in accordance with claim 1, wherein said sealing resin layer is made of epoxy resin.

12. A method of manufacturing a solid electrolytic capacitor with organic semiconductor, comprising the steps of:
    preparing a capacitor element by inserting a separator sheet between an anode foil member and a cathode foil member and rolling this material;
    heating and melting TCNQ complex salt having electrical conductivity being applicable to an electrolyte for a capacitor and impregnating the same into said capacitor element;
    forming a solid electrolyte layer by cooling and solidifying impregnated said TCNQ complex salt;
    forming a powder coating layer covering an upper portion of said capacitor element; and
    forming a sealing resin layer covering said powder coating layer for sealing said capacitor element.

13. A method of manufacturing a solid electrolytic capacitor with organic semiconductor in accordance with claim 12, wherein said step of forming a powder coating layer comprises a step of forming said powder coating layer from a powder coating material mixed with inorganic powder or an inorganic compound.

14. A method of manufacturing a solid electrolytic capacitor with organic semiconductor in accordance with claim 13, wherein said inorganic powder is prepared from at least one element selected from a group of activated clay, activated carbon, diatomaceous earth and activated alumina.

15. A method of manufacturing a solid electrolytic capacitor with organic semiconductor in accordance with claim 12, wherein said step of forming a sealing resin layer comprises a step of heating and hardening said sealing resin layer at a temperature lower than the melting temperature of said powder coating material and thereafter heating, melting and hardening said powder coating layer.

16. A method of manufacturing a solid electrolytic capacitor with organic semiconductor in accordance with claim 12, wherein said step of forming a powder coating layer comprises a step of melting said powder coating layer with steam of at least 1 atm.

* * * * *